July 14, 1970 G. LINGG 3,520,396
LOAD HANDLING DEVICES
Filed March 26, 1968 6 Sheets-Sheet 1
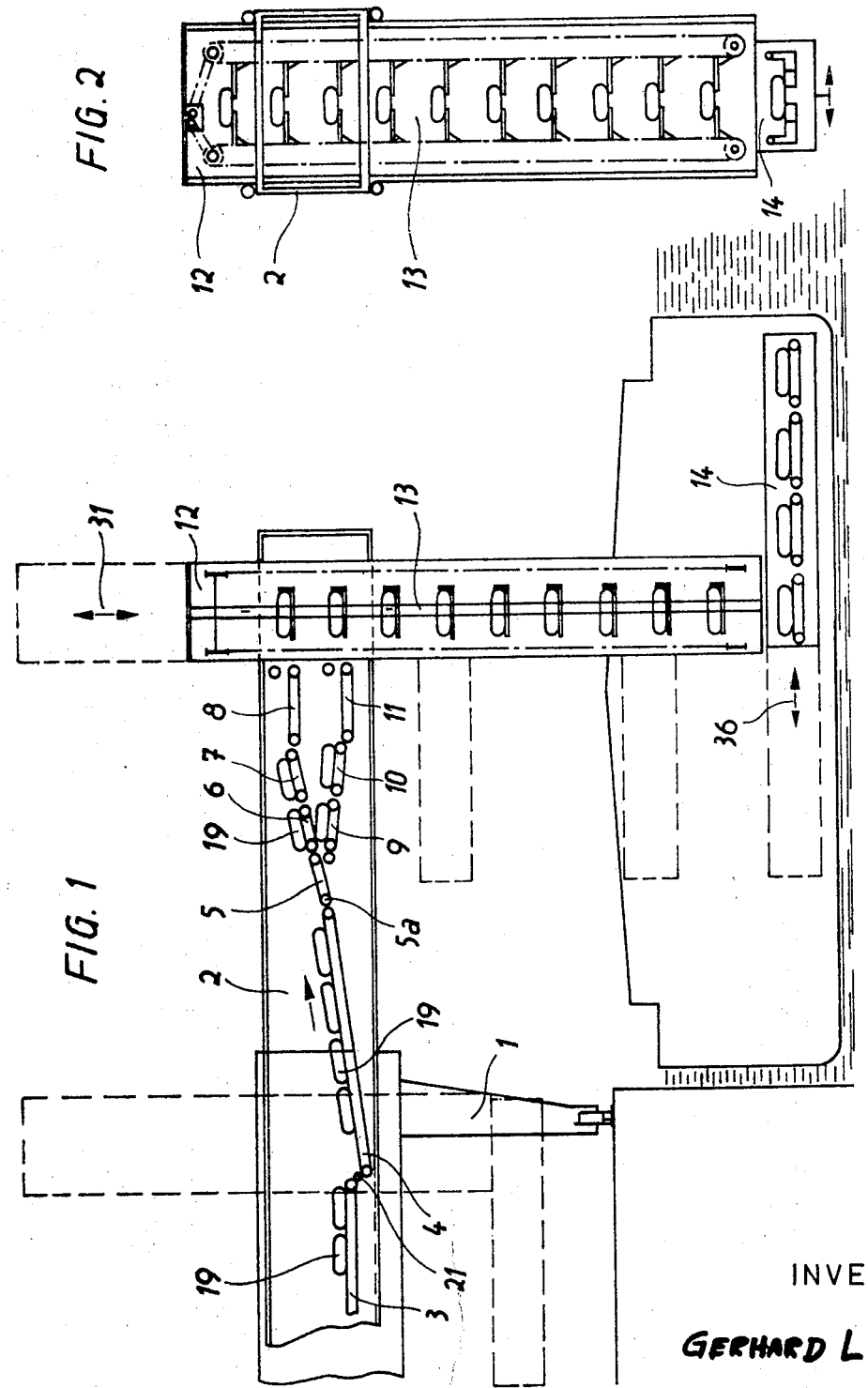
INVENTOR:
GERHARD LINGG
by
Stephen H. Frishauf
Atty

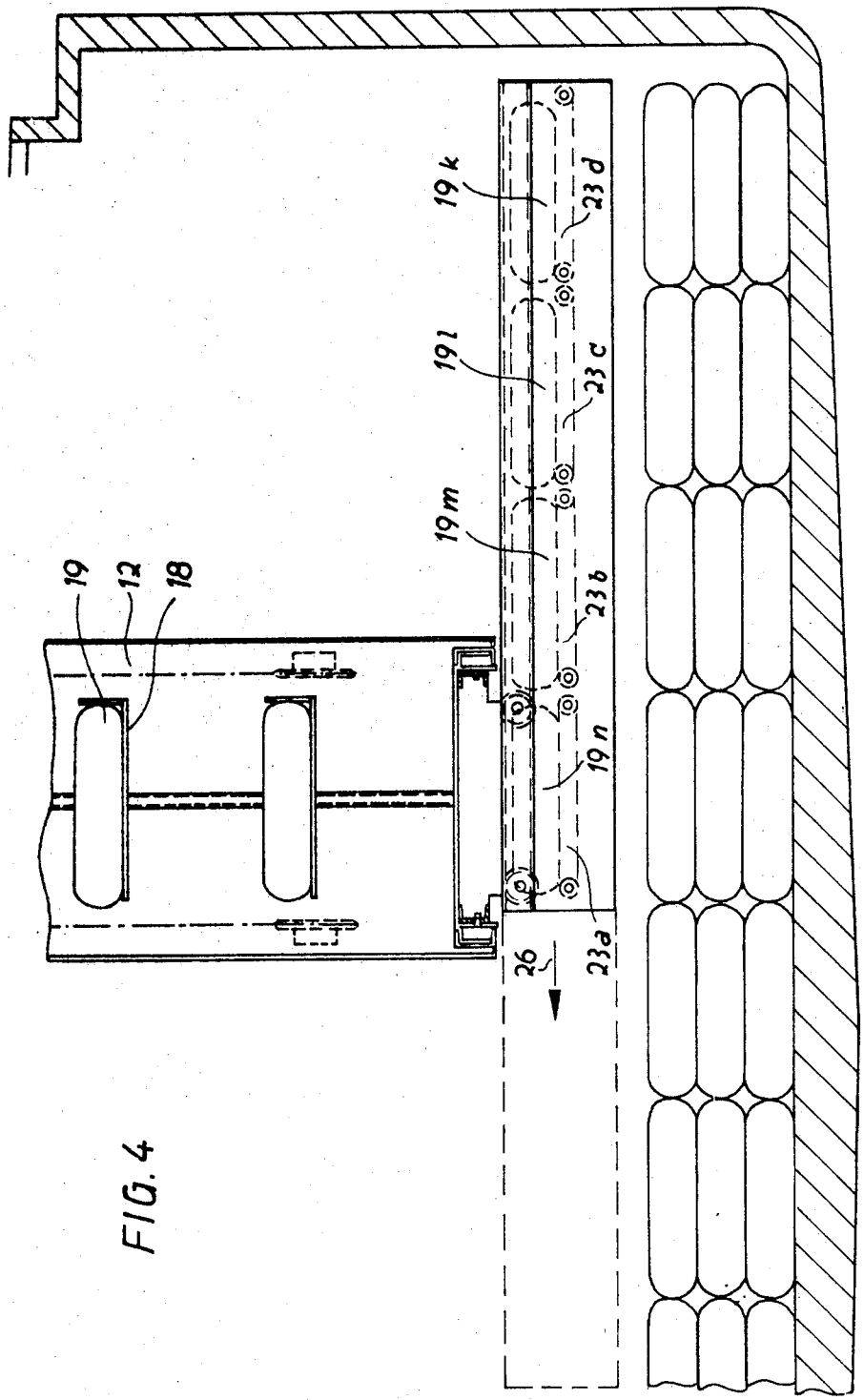

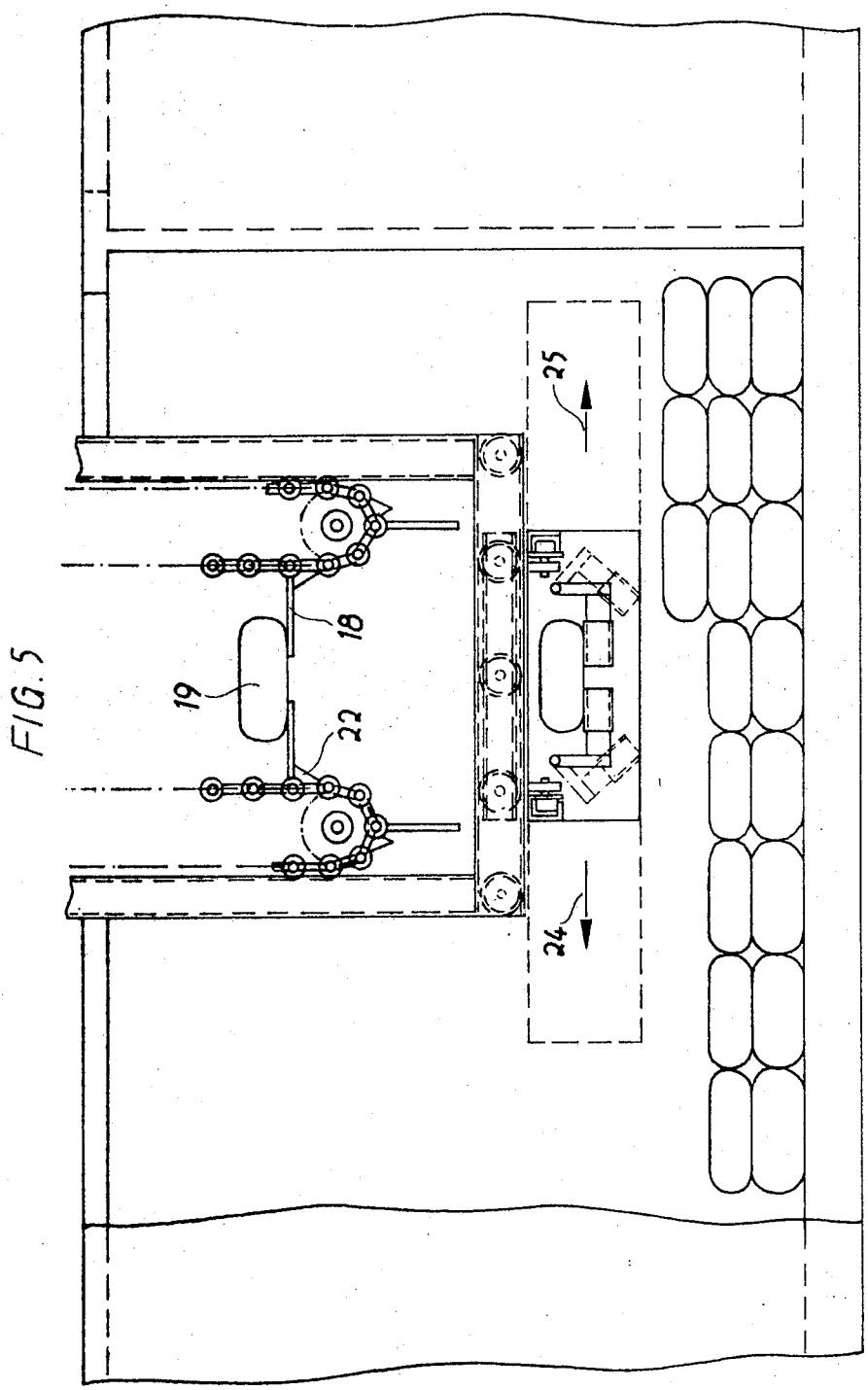

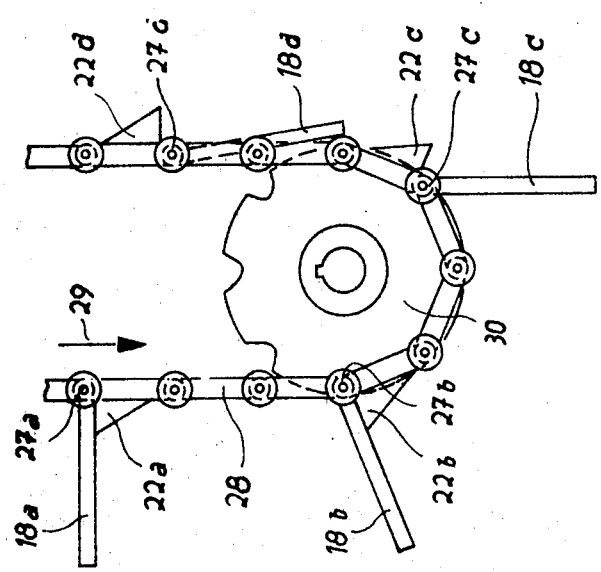
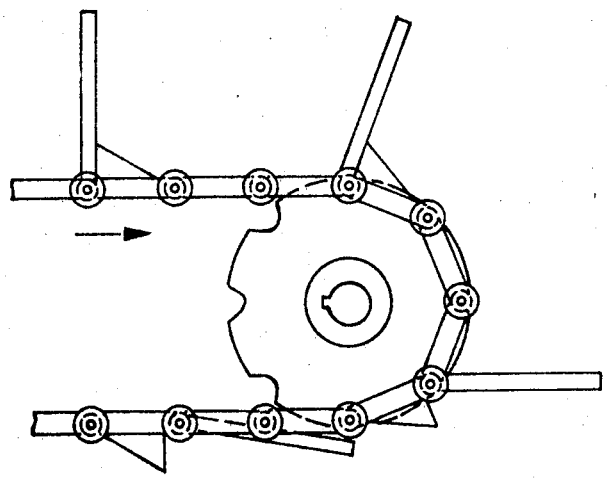
FIG. 5a

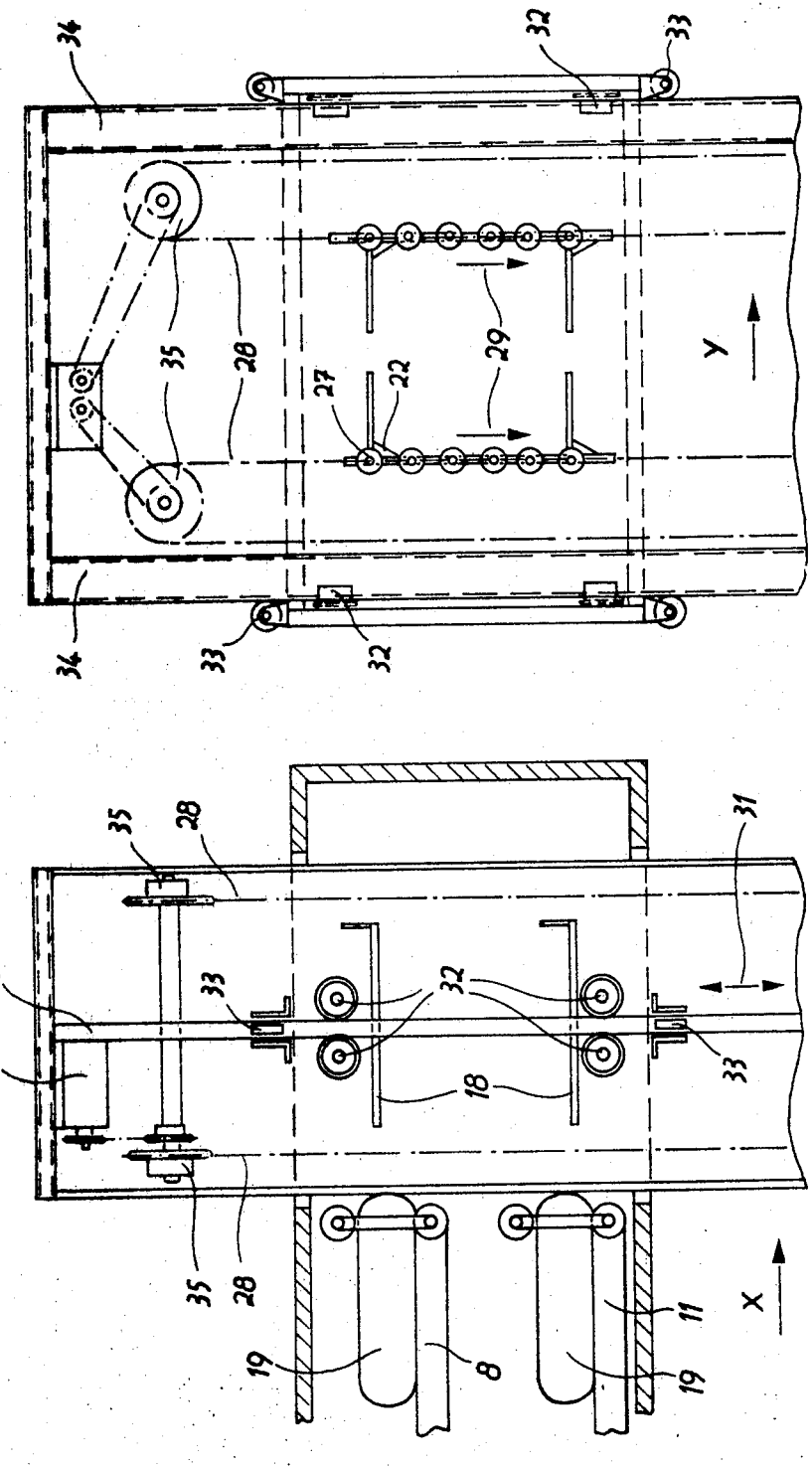

United States Patent Office 3,520,396
Patented July 14, 1970

3,520,396
LOAD HANDLING DEVICES
Gerhard Lingg, Leimen, near Heidelberg, Germany, assignor to Rudolf Geisel Maschinenfabrik, a firm of Germany
Filed Mar. 26, 1968, Ser. No. 716,707
Int. Cl. B65g 37/22, 67/58
U.S. Cl. 198—77                                   6 Claims

ABSTRACT OF THE DISCLOSURE

A telescoping bridge structure has a conveyor belt mounted therein for transport of discrete articles, such as bags, bales, or sacks; a vertical elevator shaft with a vertical conveyor having swingable release-type platforms is vertically movably connected to the bridge structure such that the platforms receive, singly, a discrete article. The release platforms communicate at their lower ends with horizontal loading runners, or conveyor belts; the first conveyor belt, vertical conveyor and horizontal runner operate in synchronism. By horizontal adjustment of the length of the bridge structure, and vertical positioning of the elevator shaft, direct loading in the holds of ships of various sizes of articles, and of different shapes, can be achieved.

---

This invention relates to load handling devices such as are used for loading bulk transport craft, e.g. ships with packaged goods. Such devices include a bridge displaceable along the transport craft and comprising a conveyor beam extensible over and retractable from the transport craft, the extremity of the beam or jib having a lowerable conveyor, the lower extremity of which carries a longitudinally displaceable conveyor acting as a loading runner.

High package throughput, per unit of time, optimum saving or elimination of labour, and optimum exploitation of storage space despite high stowing speed, are required nowadays from a modern device for plant for loading bulk carriers, such as a ship loading plant for example; such modern loading plants should moreover be sturdy robust and easily adjustable for the individual containers to be carried, for example to the individual types of sacks or bales. This means that the loading plant should for example, be able to handle consecutive batches of plastic bags, jute sacks, paper bags and the like, without disturbing continuous operation or requiring extensive adjustment. A modern ship loading plant of this nature should moreover easily be drawn out of the hull of the ship or out of the mooring space, without endangering or obstructing superstructures, masts and the like.

It has been proposed that sacked goods, for example, may be conveyed between vertical resilient conveyors, the sacks stacked one below the other being grasped by the resilient conveyors under a definite lateral contact thrust and conveyed downwards. If the degree of filling of the containers differ considerably, or if their width varies, a conveying operation of this kind is impossible.

One known plant which is mobile along the quay, comprises an extensible and retractable conveyor jib and a vertical conveyor thereon, as well as a loading runner displaceable on its lower extremity. This plant has the disadvantage however that the clearance of the mechanism displaceable along the quay must always be increased for greater variations in water level of the quayside and in deck heights.

A rectilinearly and vertically displaceable lowering conveyor is known in which the conveyor element consists of a rocker conveyor, so that all the known disadvantages of the rocker conveyor must be accepted; one of those principal shortcomings resides in that the rocker conveyor is unsuitable for high speeds, and the rocker clearance may not be smaller than a definite value, which in turn leads to the demand for increased speed for specific outputs, which cannot be fulfilled owing to the structural principle of the rocker conveyor.

The main object of the present invention is to provide a load handling device which is efficient, operates continuously and is usable for any kind of sacks or bags, in combination with simultaneous infeed of several sacks.

SUBJECT MATTER OF THE INVENTION

According to the present invention, a load handling device comprises a bridge structure displaceable along the transporter, a conveyor jib mounted on the bridge structure and operable to be moved into and out of a transporter loading position, a lowering conveyor formed of two synchronously revolving chain conveyors on the bridge structure and supprting at its lower end portion a longitudinally displaceable loading runner, and a transfer device on the jib which transfers the package to tiltable portions of the loading runner.

For the simultaneous feed of several items into the lowering conveyor, the conveyor system in the jib preferably comprises a branching point with secondary feed conveyors.

In order that the invention may be more fully understood an embodiment in accordance therewith will now be described with reference to the accompanying drawings, in which;

FIG. 1 is a side elevation of a loading device shown in operation for loading a barge or like vessel;

FIG. 2 shows a lowering conveyor;

FIG. 4 shows in detail a loading runner;

FIG. 5 shows a detail of construction;

FIG. 5a is a detail of construction; and

FIGS. 6 and 7 show the crossing point between the end of the jib and a stack displaceable thereon.

In the drawings the same references are used to designate the same or similar parts.

Figure 3C:
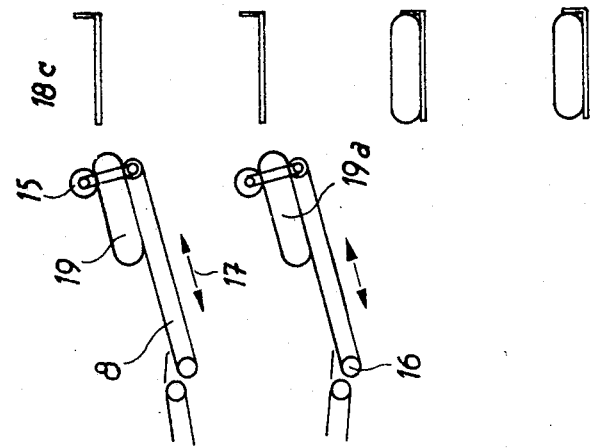
FIGS. 3a, 3b, 3c show the slotting in of sacks onto the platforms of a continuously moving lowering conveyor.

Referring to FIG. 1, a bridge structure 1 is displaceable in the longitudinal direction on a quay wall; it supports a beam or jib 2 which is extensible and retractable and extends at right angles to the longitudinal direction, i.e. to the direction of travel of the bridge structure. The jib 2 receives a series of conveyor belts 3, 4, 5, 6, 7, 8, 9, 10 and 11, to be described. The goods to be conveyed are fed to the belt 3 of the jib 2 in manner known which requires no further explanation.

On the extremity of the jib 2 remote from the bridge structure 1 is a lowering conveyor 13, with a stack 12. A loading runner 14 displaceable in the loading plane is disposed at the lower extremity of the stack. The lowering conveyor is vertically displaceable in the jib 2, as will be described. When the plant is not in operation, the jib 2 and the lowering conveyor 13 are displaced to the idle position, the jib being displaced to the extreme left in FIG. 1, beyond the path of travel of the ship. The stack is supported within the bridge structure to relieve the load on the jib 2. The displaceable loading runner 14 is withdrawn towards the left, outside the ship.

FIG. 2 shows the structure of the lowering conveyor 13 with the stack 12, as well as the loading runner 14 of FIG. 1 after being turned through 90°.

Figure 3B:
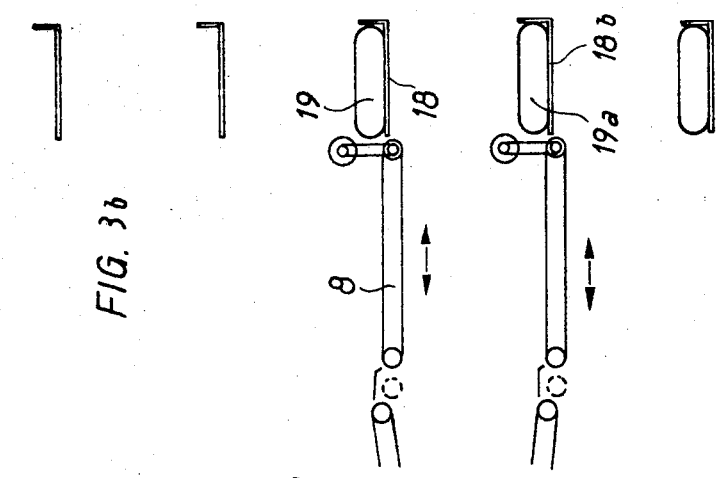
Figure 3A:
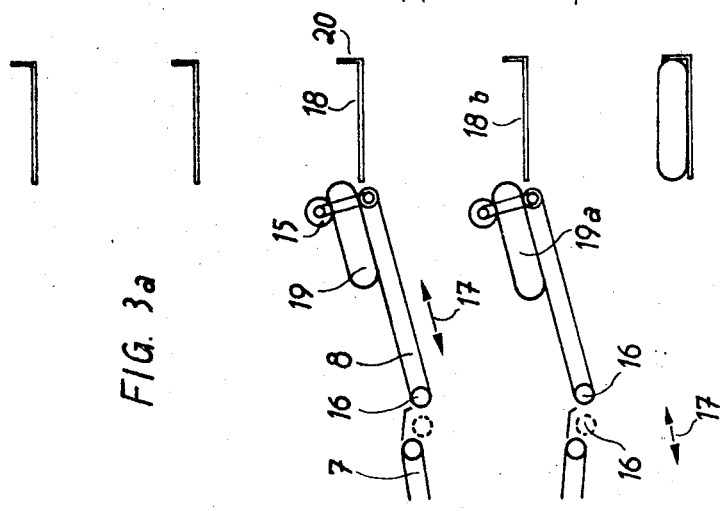

FIGS. 3a, 3b and 3c show the slotting-in of sacked goods onto the individual platforms of the continuously running lowering conveyor.

FIG. 3a shows belts 7 and 8, the belt 8 having a driven thrust roller 15 at its head end exerting a contact thrust from above on the sack 19. The belt 8 is pivotable about its axis 16 and is arranged for longitudinal displacement, in the direction of the arrow 17. At the instant when the platform 18 of the lowering conveyor is at the same height as the front extremity of the belt 8, the sack 19 is expelled onto the platform 18, the belt 8 simultaneously assuming its front terminal position by being slid forward in the direction of the arrow 17. The lowering conveyor has travelled further downwards in the meantime, the result being shown in FIG. 3b. The sack 19 now rests on the platform 18, the belt 8 accompanying this displacement, approximately to the horizontal position. This ends the actual insertion of the item of cargo into the lowering conveyor.

FIG. 3c shows the preparation for renewed insertion. To this end, the belt 8 is initially retracted in the direction of the left-hand of the arrow-head 17, another sack 19 already being placed in position prior to insertion.

As shown in FIGS. 3a, 3b and 3c, a further insertion is possible of a sack 19a onto the platform 18b in synchronism with the insertion of the sack 19 onto the platform 18.

This synchronisation of the first and second insertions is optional; more than two synchronised insertions are also possible as determined by the number of rows of belts available one below the other.

With several synchronised belts, the output per unit of time is raised to a multiple without excessive mechanical strain.

Whereas the lowering conveyor 18 runs continuously, the belts 8 and the corresponding thrust or driving rollers run discontinuously or intermittently, the motion of the belt 8 and of the thrust roller 15 being mechanically interlinked. If drive is transmitted to the belt 8 and the roller 15 from separate sources, care should be taken to ensure that their conveying speeds are synchronised.

To this end, the roller 15 is spring or weight-loaded and thrust constantly towards the sack 19 to be conveyed. The direct displacements of the belt 8, in the directions of the arrow 17, may be performed electrically, pneumatically or hydraulically, in known manner. The pivotal displacement of the belt 8 about the axis 16 occurs at the same speed as the downward motion of the platform 18. This pivotal displacement is also performed or controlled electrically in known manner.

As soon as the platform 18c (FIG. 3c) is at the height shown, i.e. still a little higher than the item of cargo 19 to be inserted, the insertion then begins immediately, the belt 8 beginning to move forward to the right in the direction of the arrow 17, the position of FIG. 3a being reached a very short time thereafter. The actual insertion of the sack now begins, under further simultaneous lowering of the belt 8 about the pivot axis 16.

A rim, railing or like stop 20 is disposed at the other side of the platform from the extermity of the belt 8 to prevent the sack 19 being thrown over the platform.

In the jib 2, the sacks 19 normally arriving at irregular intervals from the belt 3 travel over the belt 4, which is so arranged that on retracting the jib 2, it is positioned under the belt 3, ensured by the roller 21 under which the belt 4 may slide.

The distribution of the sacks 19 to the two inserting belts 8 and 11 is effected by a switching belt 5, i.e. a belt 5 pivotally arranged on a fixed spindle 5a and in sequence alternately guiding one sack to the upper run of belts and the next sack to the lower one. The belts 6, 7 as well as 9 and 10, act as an intermediate store, so that insertion of a sack may be possible at any time at the corresponding levels.

The conveying mechanism of the belts in the jib, and the conveying mechanism of the lowering conveyor 13 and the loading runner 14, are electrically interconnected or interlocked so that when a conveying element is stopped, for example on stopping the movements in the loading runner, the motion in the lowering conveyor and of the belts in the jib are also stopped. The same applies logically in respect of a stoppage in the jib and/or in the lowering conveyor as well.

FIG. 4 shows in detail the loading runner with the lower part of the lowering conveyor of FIG. 1. FIG. 5 corresponds to the lower part of FIG. 2. FIG. 5a is a detail of the pivot of the half-platforms, to be described.

The platforms 18 of the lowering conveyor 18 are centrally divided, as seen in FIG. 2.

FIG. 4 shows the manner in which, for example, four sacks 19k, 19l, and 19m and 19n one behind the other longitudinally, may be stowed in the hold of a ship. These four sacks arrive consecutively at the lower extremity of the stack and are laid on centrally divided belts 23a, 23b, 23c and 23d in the loading runner and are positioned consecutively at the same height.

FIG. 4 already shows the result of this stowing operation. This begins by placing the sack 19k on the loading belt 23a which is stopped at the instant. As soon as this has been performed, the belt 23a transfers the sack 19k to the simultaneously entrained loading belt 23b until the foremost position of the sack on the belt 23b has been reached, i.e. until this sack rests fully on the belt 23b. The two belts 23a and 23b are then stopped again, the next sack 19l is placed on the vacated belt 23a, this belt 23a is started up at the same time as the belts 23b and 23c, the sack 19k is then transferred fully to the belt 23c under simultaneous transfer of the sack 10l on to the belt 23b. The belts 23a, 23b and 23c are then stopped again at the same time, and the sack 19m drops on to the vacated belt 23a. The belts 23a, 23b, 23c and 23d are then placed in motion. Simultaneously, all three sacks being carried along by one belt length, until the sack 19k has reached the terminal position on the belt 23d, so that the belt 23a is vacated again and thus ready to receive the fourth and final sack 19n.

During this operation, the sacks are conveyed downwards continually in the lowering conveyor. The conveying speed of the belts 23a, 23b, 23d is so synchronised that the lowest sack in the lowering conveyor on arrival always finds an already vacated belt 23a.

As seen in FIG. 5, the centrally divided belts 23a to 23d then open normally, allowing the sacks placed end to end to drop. According to a variant, the loading head may also first be displaced laterally (see FIG. 1), in the direction of the arrow 24, 25.

The loading runner may be loaded in the position shown in solid lines in FIG. 4, or in the direction of the arrow 26, as well as in any intermediate positions. FIG. 5a shows the manner in which the half-platform of the lowering conveyor are pivoted, as soon as the so-called platform bearers 22 fastened to the lowering conveyor chain 28 are no longer in the vertical position during downward motion. As soon as this occurs, the platform bearers 22 allow the front extremity of the two half-platforms to lower, the platforms bearers performing a kind of "rolling-off" motion on deflecting rollers or analogus elements; as soon as the platform bearers travel upwards again, the two half-platforms hang almost vertically. Four different stages of this deflection are seen in FIG. 5a. The link chain 28 is shown running in the direction of the arrow 29, which has articulated to it the half-platforms 18a, 18b, 18c, and 18d at the points 27a, 27b, 27c, and 27d. This arrangement of the half-platforms is present at regular intervals throughout the periphery of the chain. During the sinking of the half-platforms from the horizontal to the vertical position, the sacks 19 are dropped at the same time on to the divided belts. The manner in which the half-platforms 18a retaining the horizontal position are carried by platform bearers 22a directly below the pivot pins 27a at the chain, is seen in FIG. 5a; as soon as the link chains 28 reach the pitch circles of the bottom deflecting rollers 30, the hitherto horizontal bearing surfaces of the platform bearers change their position and assume an equally vertical position at the lowest point of the deflection of the chains. The bearing surfaces of the platform bearers are perpendicular to the chains. As the bearing surfaces of the platform bearers depart from the hoizontal, the support surface for the platforms, in a horizontal direction, decreases more and more. The platform halves themselves, due to their own weight, fall down more and more, deflecting from the horizontal into the vertical direction, and eventually become essentially free hanging as soon as the chains pass their lowest point and again commence to rise.

The displacement of the stack in the extensible and retractable jib will now be described.

The stack 12 is at the outer extremity of the jib so that it is displaceable in the direction of the arrow 31, the displacement towards the bottom or the top depending on the depth of the cargo hold to be loaded or on local conditions, for example according to the depth of the cargo space of a ship or according to water level. In the course of stacking, an upward displacement of the stack will naturally be necessary with increasing height of the pile of goods stowed.

FIGS. 6 and 7 show the crossing point between the extremity of the jib 2 and the stack 12 displaceable therein. The sacks 19 are disposed on the terminal belts 8, 11. Pairs of rollers guiding the stack in the jib head are incorporated for locating the stack in the jib head in the direction of the x-axis as well as of the y-axis. The pairs of rollers 32 locate the stack in the direction of the x-axis, i.e. horizontally, and the individual rollers 33 locate the stack relative to the y-axis.

The rollers of the pairs of rollers 32 as well as the rollers 33, are firmly secured on the jib 2. Two rollers forming the pair of rollers 32 enflank a guide rail 34 on the stack. The individual rollers 33 are at right angles to the axes of the rollers of the pairs of rollers 32.

This arrangement is disposed at two opposed outer sides of the stack, two guide rails 34 thus being incorporated. Two rollers conjointly forming a pair of rollers 32, in each case thus run along the two sides of the guide rail. The single roller system 33 runs at right angles thereto on the guide rail.

Top chain deflecting rollers 35 are shown in FIGS. 6 and 7. Drive is transmitted to the chain through the spindle of the top chain deflecting rollers from a driving system 36, for example from an electric motor.

The upward or downward displacement of the stack is performed for example, by applying a force on toothed bars which are firmly secured on the stack and constructed as guide rails 34. The electrically actuated driving system for the displacement of the stack is in the jib. Displacement is also possible by a cable drive, as in known elevators.

Control is exercised by an operative from a control station on the bridge structure 1, its position being so chosen as to ensure optimum visibility of the cargo space.

What we claim is:

1. A load handling device for loading package goods forming discrete articles into a transporter comprising:
  a bridge structure (1) displaceable along the transporter;
  a conveyor jib mounted on the bridge structure and operable to be moved into and out of transporter loading position;
  a lowering conveyor (12, 13) including a synchronously revolving chain (FIG. 5a, 28) and located to receive articles from the conveyor jib secured to the bridge structure, said lowering conveyor comprising a pair of synchronously moving parallel endless chains (13; FIG. 5a: 28) located to face each other and swingable platforms (18; FIG. 5a: 18c) hinged on said chains;
  a longitudinally displaceable loading runner (14) having portions tiltable about their outer edges supported on the lower end portion of the lowering conveyor; and
  a transfer device (8, 15) on the jib (2) which transfers the packages to said lowering conveyor.

2. Load handling device according to claim 1 wherein said transfer device includes a belt system intermittently synchronously moving with the vertical movement of the revolving chain of the lowering conveyor to place an article on said conveyor.

3. Load handling device according to claim 2 wherein the belt system in the jib includes a branching point with secondary feed conveyors, and a plurality of transfer devices, one each communicating with a secondary feed conveyor, for simultaneous loading of a plurality of articles on said lowering conveyor.

4. Load handling device according to claim 1;
  including brackets (22a) located to bear against said chains secured to said platforms and disposed to be underneath said brackets when said platforms face each other on said chains whereby said platforms will, conjointly, receive and support an article when facing each other and fold flat against said chains and hang by gravity when facing away from each other.

5. Load handling device according to claim 4 wherein the transfer device comprises a belt (8) and a roller (15) driven in synchronism with the belt located above the belt, said belt and roller being adapted to grip an article therebetween;
  the belt and roller being operated in synchronism with the positioning of said platforms in front of said transfer device to place an article on said platform.

6. Load handling device according to claim 1;
  wherein said transfer device comprises an endless, elongated belt, said endless elongated belt being swingably mounted about an axis transverse to its movement and remote from its end near the lowering conveyor, said belt moving about said axis in synchronism with movement of said conveyor during transfer of an article from said belt to said platform.

References Cited

UNITED STATES PATENTS

| | | | |
|---|---|---|---|
| 760,479 | 5/1904 | Patterson | 198—77 |
| 1,991,652 | 2/1935 | Bean | 198—88 |

HUGO O. SCHULZ, Primary Examiner

U.S. Cl. X.R.

198—163; 214—14